(12) United States Patent
Sauber et al.

(10) Patent No.: US 9,798,662 B2
(45) Date of Patent: Oct. 24, 2017

(54) SYSTEM AND METHOD FOR PERFORMING SYSTEM MEMORY SAVE IN TIERED/CACHED STORAGE

(71) Applicant: Dell Products L.P., Round Rock, TX (US)

(72) Inventors: William F. Sauber, Georgetown, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/060,219

(22) Filed: Mar. 3, 2016

(65) Prior Publication Data

US 2016/0188467 A1  Jun. 30, 2016

Related U.S. Application Data

(63) Continuation of application No. 14/643,882, filed on Mar. 10, 2015, now Pat. No. 9,311,008, which is a continuation of application No. 13/074,958, filed on Mar. 29, 2011, now Pat. No. 9,009,407.

(51) Int. Cl.
*G06F 3/06* (2006.01)
*G06F 12/0804* (2016.01)
*G06F 12/0895* (2016.01)
*G06F 1/32* (2006.01)
*G06F 1/26* (2006.01)

(52) U.S. Cl.
CPC ............ *G06F 12/0804* (2013.01); *G06F 1/26* (2013.01); *G06F 1/3203* (2013.01); *G06F 3/0619* (2013.01); *G06F 3/0625* (2013.01); *G06F 3/0634* (2013.01); *G06F 3/0643* (2013.01); *G06F 3/0647* (2013.01); *G06F 3/0659* (2013.01); *G06F 3/0685* (2013.01); *G06F 3/0688* (2013.01); *G06F 12/0895* (2013.01); *G06F 2212/1032* (2013.01)

(58) Field of Classification Search
CPC .... G06F 1/3203; G06F 3/0625; G06F 3/0647; G06F 3/0685
See application file for complete search history.

(56) References Cited

U.S. PATENT DOCUMENTS

| | | | |
|---|---|---|---|
| 9,009,407 B2 * | 4/2015 | Sauber | G06F 12/0895 711/118 |
| 9,311,008 B2 * | 4/2016 | Sauber | G06F 12/0895 |
| 2003/0070065 A1 | 4/2003 | Fleming | 713/2 |

(Continued)

*Primary Examiner* — Edward Dudek, Jr.
(74) *Attorney, Agent, or Firm* — Baker Botts L.L.P.

(57) ABSTRACT

In accordance with the present disclosure, a system and method for performing a system memory save in tiered or cached storage during transition to a decreased power state is disclosed. As disclosed herein, the system incorporating aspects of the present invention may include a solid-state drive, volatile memory, and at least one alternate storage media. Upon transition to a decreased power state, at least some of the data in the solid-state drive may be transferred to the at least one alternate storage media. After the SSD data is transferred, data stored in volatile system memory, such as a system context, may be transferred to the SSD memory. With the system context saved in SSD memory, power to the volatile system memory may be turned off.

20 Claims, 5 Drawing Sheets

(56) References Cited

U.S. PATENT DOCUMENTS

| | | | |
|---|---|---|---|
| 2005/0044448 A1* | 2/2005 | Verdun | G06F 1/3225 714/22 |
| 2006/0224905 A1* | 10/2006 | Plante | G06F 1/3203 713/300 |
| 2009/0172439 A1* | 7/2009 | Cooper | G06F 1/3203 713/323 |
| 2009/0319720 A1* | 12/2009 | Stefanus | G06F 12/0246 711/103 |
| 2010/0281230 A1* | 11/2010 | Rabii | G06F 3/0605 711/165 |
| 2011/0082987 A1 | 4/2011 | Sauber et al. | 711/161 |
| 2011/0185208 A1* | 7/2011 | Iwamoto | G06F 1/3203 713/323 |
| 2012/0144177 A1* | 6/2012 | Iyigun | G06F 9/4418 713/2 |
| 2012/0203960 A1* | 8/2012 | Tetrick | G06F 12/0866 711/103 |

\* cited by examiner

SYSTEM AND METHOD FOR PERFORMING
SYSTEM MEMORY SAVE IN
TIERED/CACHED STORAGE

CROSS REFERENCES TO RELATED
APPLICATIONS

This application is a continuation application of U.S. patent application Ser. No. 14/643,882 entitled "System and Method for Performing System Memory Save in Tiered/Cached Storage" which was filed on Mar. 10, 2015, which was a continuation application of U.S. patent application Ser. No. 13/074,958 entitled "System and Method for Performing System Memory Save in Tiered/Cached Storage" which was filed on Mar. 29, 2011 and which are incorporated herein by reference in their entirety for all purposes.

TECHNICAL FIELD

The present disclosure relates generally to the operation of computer systems and information handling systems, and, more particularly, to a System and Method For Performing System Memory Save in Tiered/Cached Storage.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include many different devices and components. Each of the devices and components require power to operate, and the information handling system may include pre-defined power states in which the information handling system may operate. The pre-defined power states may be, for example, the power states defined by the Advanced Configuration and Power Interface Specification (ACPI). The ACPI includes various sleep states in which segments of the information handling system are powered down at the expense of wake latency and system context. One example state, S3, is a low wake latency sleeping state where all system context is lost, except for volatile system memory, e.g. RAM, which remains powered. One problem with S3 is that, in large memory systems, the S3 state still requires significant power consumption. Moreover, transferring to a lower power state, such as S4, where all devices are powered off, significantly increases the wake latency of the computer system.

SUMMARY

In accordance with the present disclosure, a system and method for performing a system memory save in tiered or cached storage during transition to a decreased power state is disclosed. As disclosed herein, the system incorporating aspects of the present invention may include a solid-state drive, volatile memory, and at least one alternate storage media. Upon transition to a decreased power state, at least some of the data in the solid-state drive may be transferred to the at least one alternate storage media. After the SSD data is transferred, data stored in volatile system memory, such as a system context, may be transferred to the SSD memory. With the system context saved in SSD memory, power to the volatile system memory may be turned off.

The system and method disclosed herein is technically advantageous because it creates an intermediate low power, low latency system sleep state, which offers less power consumption and faster waking function than existing ACPI sleep states. Additionally, it exploits SSD memory in a system with multiple types and levels of storage media, utilizing both the configuration or existing cached and tiered systems and the speed of SSD memory to increase power consumption without drastically decreasing wake latency. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
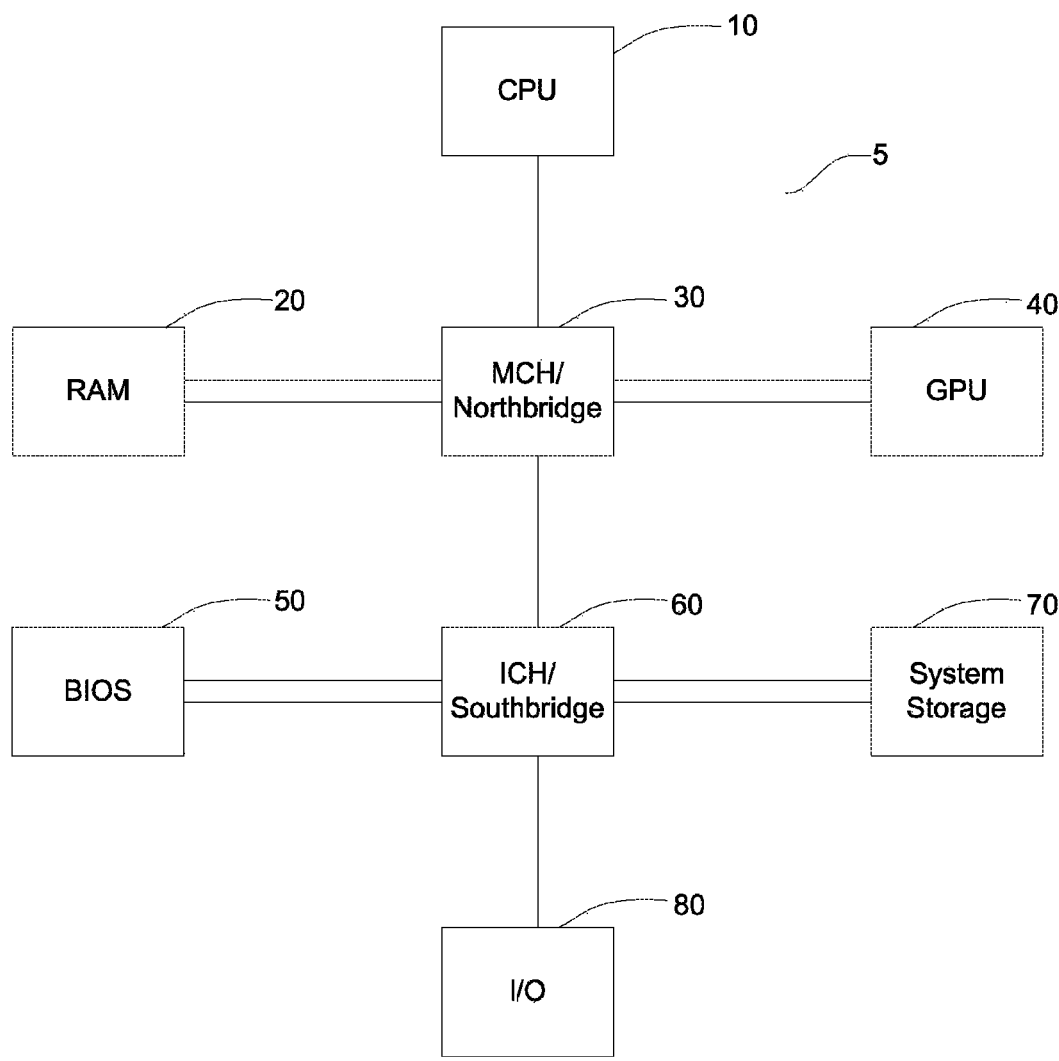
FIG. 1 is an example information handling system according to aspects of the present invention.

Shown in FIG. 1 is a block diagram of a typical information handling system. A processor or CPU 10 of the typical information handling system 5 may be communicatively coupled to a memory controller hub or northbridge 30. Memory controller hub 30 may coupled to volatile memory 20 and a graphics processing unit 40. The volatile memory 20 may be random access memory (RAM) that is typically used to store system context or system memory during a transition to an S3 sleep state. Memory controller hub 30 may also be coupled to an I/O controller hub or southbridge 60. I/O hub 60 may be coupled to storage elements of the computer system, including a storage element 50, which may be ROM for the BIOS of the computer system, and the system storage 70 of the computer system. The system storage 70 may be the primary storage medium for the information handling system 5, and may include, for example, a combination of storage media, such as hard disk drives (HDDs), optical drives, and solid-state drives (SSDs) such as flash memory.

Figure 2:
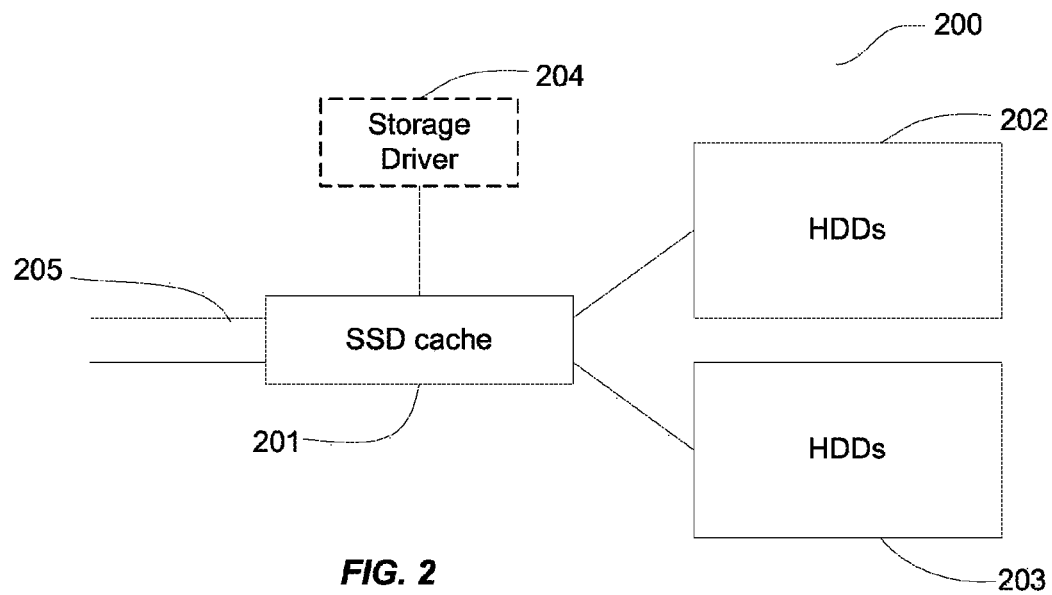
FIG. 2 is an example storage system according to aspects of the present invention.

FIG. 2 shows one embodiment of a storage system 200 in which aspects of the present invention may be incorporated. Storage system 200 may include an SSD cache 201, which may include non-volatile, fast access memory such as flash memory. The SSD cache 201 may be communicatively coupled to other components in an information handling system via bus 205. The SSD cache 201 may also be communicatively coupled to HDDs 202 and 203, which may be the primary storage media for an information handing system. In certain embodiments, an information handling system, such as information handling system 5 in FIG. 1, may include instructions for software dedicated to managing read/write commands to storage media, such as a storage driver. The instructions may be stored in storage media, such as a HDD, and may be executed by a processor in the system, such as the CPU or a storage controller. In the embodiment shown in FIG. 2, storage driver 204 may direct the SSD cache 201 to cache certain files for the cache source, HDDs 202 and 203, according to a caching policy. One example caching policy is a write-back policy in which modifications to data in the cache are not copied to the cache source until absolutely necessary.

Figure 3:
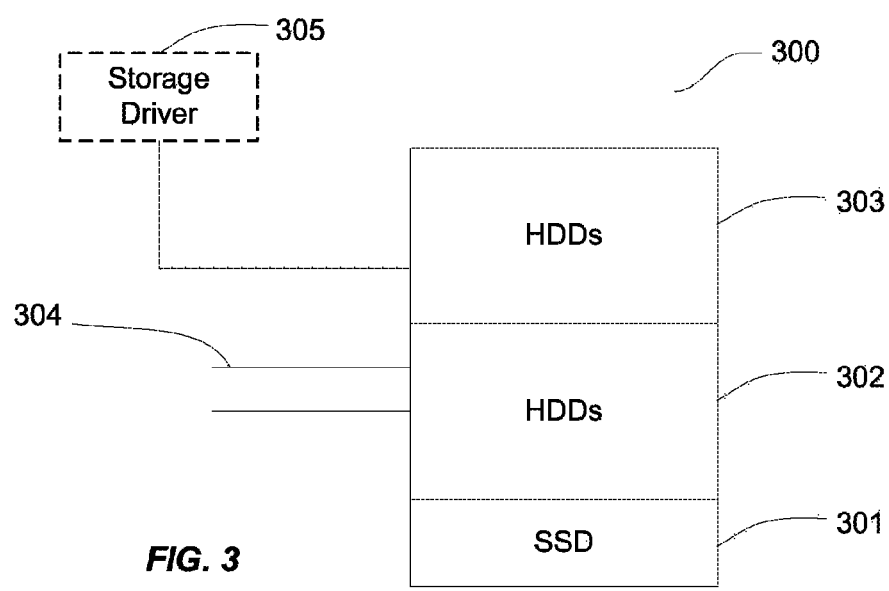
FIG. 3 is an example storage system according to aspects of the present invention.

FIG. 3 shows a different embodiment of a storage system 300 in which aspects of the present invention may be incorporated. Storage system 300 may include a tiered or hierarchical storage system, consisting of two or more kinds of storage delineated by differences in at least one characteristic, such as price, performance, capacity or function. The storage media may be organized into tiers according to access times for each type of storage media. Storage system 300 may include an SSD memory 301 in one tier and HDDs 302 and 303 in another tier. The SSD memory 301 may be comprised of flash memory or other well known SSD storage media known in the art. The storage system may communicate with an information handling system through communication bus 304. Additionally, dedicated software, such as storage driver 305, may control read/write commands to the tiered storage system 300. Because SSD memory is typically much faster than HDDs, the storage driver 305 may direct the most frequently accessed files to be stored in the SSD portion 301. Likewise, storage driver 305 may direct the transfer of less frequently accessed files to SSD portion 301 if the access frequently increases. Conversely, files that are accessed less frequently may be stored in HDDs 302 and 303.

Figure 4:
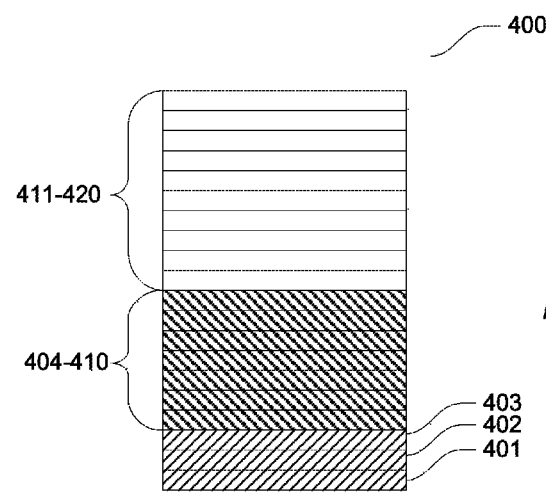
FIG. 4 is an example SSD according to aspects of the present invention.

A system incorporating aspects of the present invention may exploit the non-volatile memory, such as SSD memory, in either the memory cache or tiered storage system to store system information during certain system sleep states. FIG. 4 illustrates one example embodiment of nonvolatile memory, SSD memory 400, incorporating aspects of the present invention. The SSD memory 400 includes memory blocks for storing data. In certain embodiments, some of the blocks of the SSD memory 400 may be used to store transfer data—data that may be used, as will be explained, in the process for storing system information to nonvolatile memory, such as SSD memory 400, during sleep transition. One example may be an available block list, stored in memory block 401. The available block list may identify empty blocks within the SSD memory, such as memory blocks 411-420, which can be used to cache files or save system memory upon transition into a sleep state. Another example may be target block list, stored in memory block 402. The target block list may identify empty blocks within the SSD memory for saving system memory upon transition into a sleep state, and may be the same as or a subset of the available block list. An additional example may be a flush block list, stored in memory block 403. The flush block list may identify occupied blocks within the SSD memory, such as blocks 404-410, which must be transferred before system memory can be stored there. A flush block list may, in certain embodiments, include both a source (the SSD memory block) and a location (an HDD block corresponding to the file). The available block list, the target block list, and the flush block list, however, are not meant to be limiting, as numerous other examples of transfer data are possible, including transfer data stored in various locations with the SSD memory or outside of the SSD memory.

Figure 5:
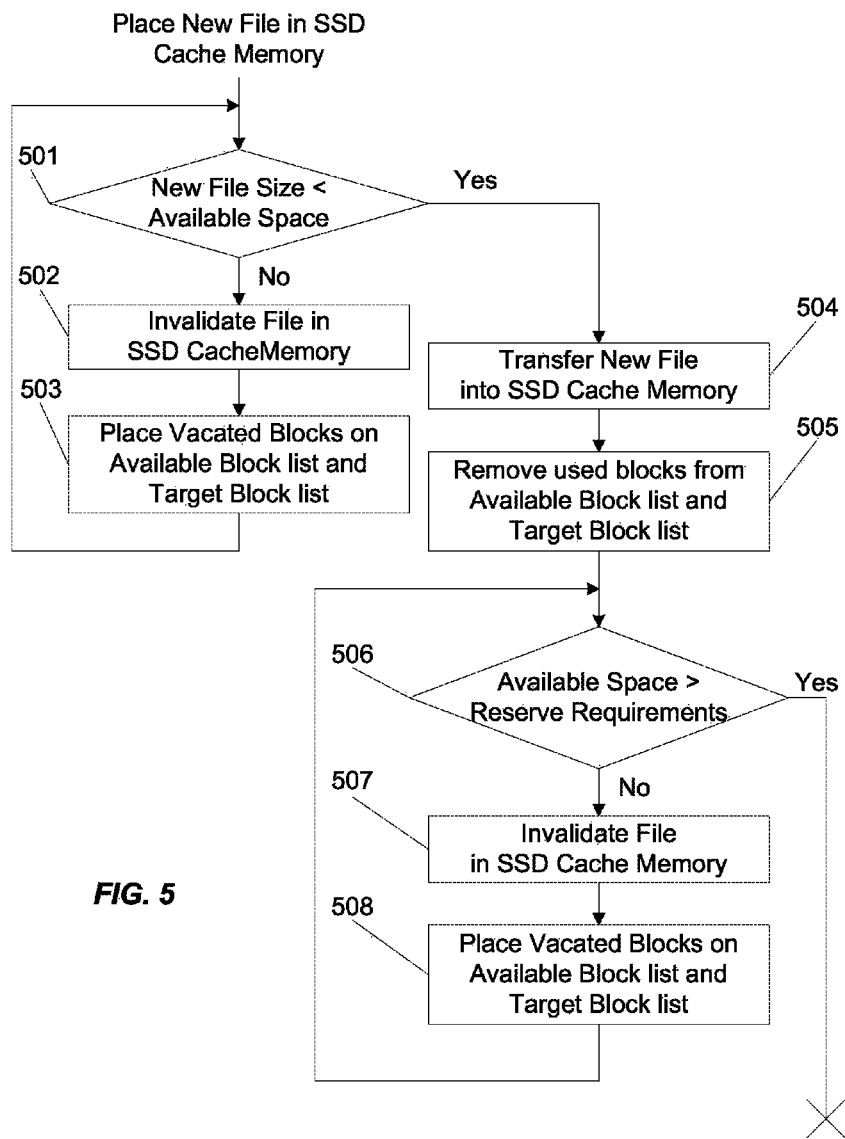
FIG. 5 is an example process for SSD memory management according to aspects of the present invention may be implemented.

Each of the available block list, the target block list, and the flush block list may be updated and maintained as part of the operation of a storage system. FIG. 5 illustrates one example process by which the lists may be updated during the operation of cache memory. In certain embodiments, a storage driver, such as the storage driver discussed earlier, may update and maintain the transfer data. In other embodiments, other system and software components may be used to update and maintain the transfer data. Additionally, a similar process may be used in other configurations, including a configuration with a tiered storage system.

The process may start when an information handling system attempts to place a new file within cache memory. At step 501, a system or a component of the system, such as a storage driver, may determine whether the size of the new file is less than the size of the available space in the cache SSD memory. The available space within the cache SSD memory may be determined by multiplying the number of blocks in the available block list with the size of each block, or the available size may be a separately tracked by the system. If the new file size is greater that the available space in cache SSD memory, an existing block or blocks in cache SSD memory may either be transferred to the cache source or invalidated by the system at step 502. As the block is now vacant, the system may then place an identifier for the block on both the available block list and the target block list at step 503.

If the new file size is less than the available space in the cache SSD memory, then the system may transfer the new file into SSD cache memory at step 504. Because previously vacant blocks are now occupied, the system may then update both the available space list and the target block list by removing the occupied blocks at step 505. The process may then move to step 506, where the system determines whether the available space left in the cache SSD memory is greater than a reserve requirement. The reserve requirement may be any amount of memory that needs to be left available for system operations. This may include leaving blocks open to facilitate a quicker transition to a sleep state, leaving blocks open to accommodate the expansion of the available block, target block, or flush block lists, etc. If the available space does not exceed the reserve requirements, existing block or blocks in SSD cache memory may either be transferred to the cache source or invalidated by the system at step 507. The vacated blocks may then be placed on both the available block and target block lists in step 508. If, alternatively, the available space does exceed the reserve requirement, the system may exit the process and await further instructions.

Figure 6:
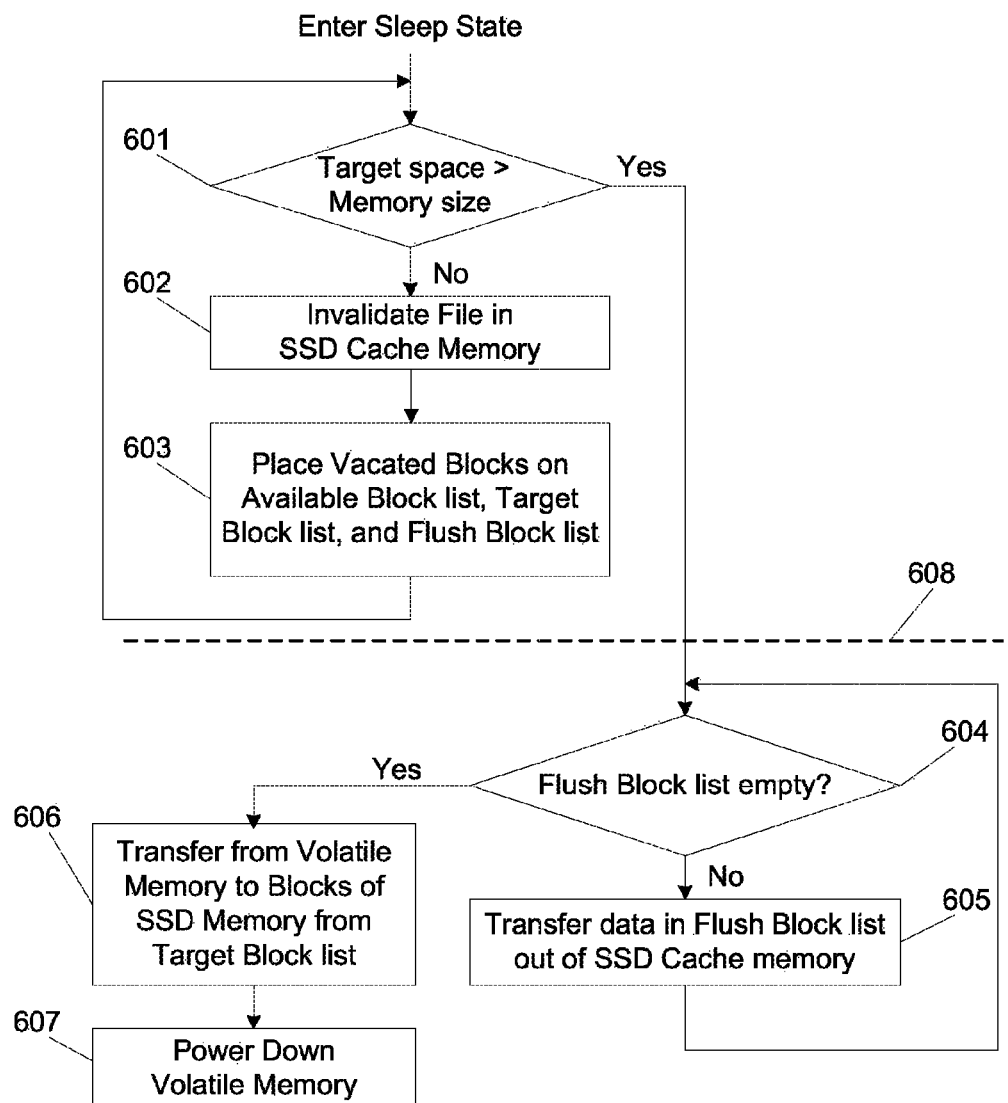
FIG. 6 is an example process for transition to a decreased power state according to aspects of the present invention.

FIG. 6 illustrates an example process by which a information handling system transfers into a low power, low latency sleep state according to aspects of the present invention. The process may begin when the information handling system issues or receives a command to enter into a low power, low wake latency sleep state. At step 601, the system may determine whether a target space is greater than the size of memory to be transferred into SSD cache memory from volatile memory. Target space may, for example, be determined using the target block list and multiplying the number of blocks in the target block list by the size of an SSD cache memory block. If it is determined at 601 that the target space is too small to accommodate the memory to be transferred, the storage driver may, at step 602, invalidate a file—remove a memory flag corresponding to a file—in the SSD memory. At step 603, the system may add the vacated block to the flush block list, the available block list, and the target block list. The process may continue comparing target space with memory size and invalidating files until the target space is large enough to accommodate the memory to be transferred. After enough space in the SSD memory is available, the flush block is finalized.

Once the flush block list is finalized, the system may move on to processing the flush block list at step 604 by transferring the files in the flush block list out of SSD cache memory and into an alternate storage media, such as HDD. The system may transfer each file in the flush block list at the same time at step 605 or, alternatively, may transfer each file individually and iteratively until the flush block list is empty. Once the flush block list is empty at step 604, meaning each file listed in the flush block list has been stored elsewhere in the system, such as HDDs, the system may continue to step 606, in which the memory to be transferred, such as system context from volatile memory, is transferred to the SSD memory. In some embodiments, the memory to be transferred may be transferred using a simple, in-order transfer, so that the data location of each block of the memory to be transferred is preserved across save and restore. Once the memory is transferred, the system may move to step 607, in which the volatile system memory is powered down.

Figure 7:
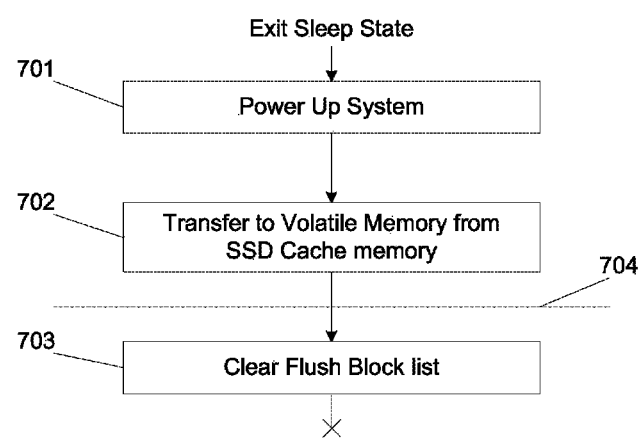
FIG. 7 is an example process for transition out of a decreased power state according to aspects of the present invention.

FIG. 7 illustrates one example process from waking from a low power, low latency sleep state, according to aspects of the present invention. The process may begin when an information handling system issue or receives a wake command. In some embodiments, the wake command may be received from a user of the information handling system attempting to use an I/O mechanism of the computer system, such as a keyboard or mouse. After receiving or issuing the wake command, the system may first, at step 701, power up system components. At step 702, the system may transfer the data stored in SSD memory back to its source, volatile system memory or RAM. After the memory is transferred, the system may clear the flush block list at step 703, ensuring that none of the SSD memory blocks are set to be flushed.

In certain embodiments, some or all of the steps identified in FIGS. 6 and 7 may be accomplished using a storage driver, such as the storage drivers described earlier. In other embodiments, some or all of the steps may be accomplished by another system components, such as BIOS. For example, a storage driver may perform steps 601-603, finalizing the flush block list, and passing the flush block list, available block list, and transfer block list to a different system components, such as BIOS, as indicated by line 608. The BIOS may then transfer data out of the SSD memory according to the flush block list, and transfer memory from volatile memory into the SSD memory per the transfer block list, as illustrated in steps 604-606. Additionally, once a wake command is received or issued, the BIOS may perform steps 701 and 702 from FIG. 7, powering up the system and transferring the SSD memory contents back to volatile memory, and then pass the flush block list back to the storage driver for processing, as illustrated by line 704. Other configuration and processing mechanisms are possible, as will be seen by one of ordinary skill in the art in view of the present application.

A system incorporating aspects of the present invention is beneficial in that it allows for a low latency, low power sleep state. For example, a system incorporating aspects of the present invention may include an intermediate power state between ACPI S3 and S4, with lower power consumption than S3 and lower wake latency than S4. Because SSD memory is used instead of RAM or volatile memory to store system context, the volatile memory can be powered down, saving considerable power in large storage system applications. Additionally, the power savings is accompanied with a minimal increase in latency, as the SSD memory is fast access and the system context can be quickly transferred back to volatile memory when a wake command is issued or received. Finally, a system incorporating aspects of the present invention is beneficial in that it exploits SSD memory in a system with multiple types and levels of storage media, utilizing both the configuration or existing cached and tiered systems and the speed of SSD memory to increase power consumption without drastically decreasing wake latency.

Although the present disclosure has been described in detail, it should be understood that various changes, substitutions, and alterations can be made hereto without departing from the spirit and the scope of the invention as defined by the appended claims.

What is claimed is:

1. A non-transitory computer-readable storage medium encoded with processing instructions for implementing a method for performing a system memory save in non-volatile tiered cached storage, wherein the non-volatile tiered cached storage comprises a plurality of non-volatile storage media, the processing instructions for directing an information handling system comprising at least one processor to perform the steps of:

receiving a command to transition into a decreased power state;
determining a size of a volatile memory to be transferred to the non-volatile tiered cached storage;
determining if the size of the volatile memory is less than a size of available space of a target space, wherein the target space comprises a first at least one of the plurality of non-volatile storage media;
invalidating one or more blocks of the target space, wherein the invalidating continues until the available space of the target space is large enough to store the volatile memory;
adding the one or more blocks of the target space to a flush block list;
processing the flush block list, wherein processing the flush block list comprises transferring one or more files associated with the flush block list out of the target space into an alternate space, wherein the alternate space comprises a second at least one of the plurality of non-volatile storage media;
transferring the volatile memory to the target space; and
powering down the volatile memory.

2. The non-transitory computer-readable storage medium of claim 1, wherein the plurality of non-volatile storage media are organized into the non-volatile tiered cached storage based, at least in part, on access times of each individual non-volatile storage media of the plurality of non-volatile storage media.

3. The non-transitory computer-readable storage medium of claim 1, wherein the processing instructions further direct the information handling system to perform the steps of:
adding the one or more blocks of the target space to an available block list and a target block list.

4. The non-transitory computer-readable storage medium of claim 1, wherein the target space comprises at least one SSD in the information handling system.

5. The non-transitory computer-readable storage medium of claim 1, wherein the alternate space comprises a hard disk drive.

6. The non-transitory computer-readable storage medium of claim 1, wherein the plurality of non-volatile storage media comprise at least two different non-volatile storage media, and wherein the at least two different non-volatile storage media differ in at least one of price, performance, capacity, and function.

7. The non-transitory computer-readable storage medium of claim 1, wherein the processing instructions further direct the information handling system to perform the steps of:
receiving a wake command to wake from the powered-down state;
transferring contents of the target space transferred from the volatile memory back to the volatile memory; and
clearing the flush block list.

8. The non-transitory computer-readable storage medium of claim 7, wherein the flush block list is cleared by a storage driver.

9. A system for performing a system memory save in non-volatile tiered cached storage, comprising:
a processor;
a non-volatile tiered cached storage comprising a plurality of non-volatile storage media, wherein the non-volatile tiered cached storage is operable to cache files for the plurality of non-volatile storage media;
a volatile memory; and
a computer-readable storage medium encoded with processing instructions, wherein the processing instructions when executed:
receive a command to transition into a decreased power state;
determine a size of the volatile memory, wherein the volatile memory is to be transferred to the non-volatile tiered cached storage;
determine if the size of the volatile memory is less than a size of available space of a target space, wherein the target space comprises a first at least one of the plurality of non-volatile storage media;
invalidate one or more blocks of the target space, wherein the invalidation continues until the available space of the target space is large enough to store the non-volatile memory;
add the one or more blocks of the target space to a flush block list;
process the flush block list, wherein the processing the flush block list comprises transferring one or more files associated with the flush block list out of the target space into an alternate space, wherein the alternate space comprises a second at least one of the plurality of non-volatile storage media;
transfer the volatile memory to the target space; and
powering down the volatile system memory.

10. The system of claim 9, wherein the plurality of non-volatile storage media are organized into the non-volatile tiered cached storage based, at least in part, on access times of each individual non-volatile storage media of the plurality of non-volatile storage media.

11. The system of claim 9, wherein the processing instructions further direct the processor to add the one or more blocks of the target space to an available block list and a target block list.

12. The system of claim 9, wherein the target space comprises at least one SSD in the information handling system.

13. The system of claim 9, wherein the alternate space comprises a hard disk drive.

14. The system of claim 9, wherein the plurality of non-volatile storage media comprise at least two different non-volatile storage media, and wherein the at least two different non-volatile storage media differ in at least one of price, performance, capacity, and function.

15. The system of claim 9, wherein the processing instructions further direct the processor to:
wake from the powered-down state upon receipt of a wake command;
transfer contents of the target space transferred from the volatile memory back to the volatile memory; and
clear the flush block list.

16. The system of claim 15, wherein the flush block list is cleared by a storage driver.

17. A non-transitory computer-readable storage medium encoded with processing instructions for implementing a method for performing a system memory save in non-volatile tiered cached storage, wherein the non-volatile tiered cached storage comprises a plurality of non-volatile storage media, the processing instructions for directing an information handling system comprising at least one processor to perform the steps of:
determining a size of a volatile memory to be transferred to the non-volatile tiered cached storage;
determining if the size of the volatile memory is less than a size of available space of a target space, wherein the target space comprises a first at least one of the plurality of non-volatile storage media;

invalidating one or more blocks of the target space, wherein the invalidating continues until the available space of the target space is large enough to store the volatile memory;

adding the one or more blocks of the target space to a flush block list;

processing the flush block list, wherein processing the flush block list comprises transferring one or more files associated with the flush block list out of the target space into an alternate space, wherein the alternate space comprises a second at least one of the plurality of non-volatile storage media;

transferring the volatile memory to the target space; and powering down the volatile system memory.

18. The non-transitory computer-readable storage medium of claim 17, wherein the plurality of non-volatile storage media are organized into the non-volatile tiered cached storage based, at least in part, on access times of each individual non-volatile storage media of the plurality of non-volatile storage media.

19. The non-transitory computer-readable storage medium of claim 18, wherein the processing instructions for directing the information handling system are further operable to perform the steps of:

receiving a wake command to wake from the powered-down state;

transferring contents of the target space transferred from the volatile memory back to the volatile memory; and clearing the flush block list.

20. The non-transitory computer-readable storage medium of claim 17, wherein the plurality of non-volatile storage media comprise at least two different non-volatile storage media, and wherein the at least to different non-volatile storage media differ in at least one of price, performance, capacity, and function.

* * * * *